United States Patent [19]

Uchida et al.

[11] Patent Number: 5,061,778

[45] Date of Patent: Oct. 29, 1991

[54] RESIN COMPOSITION FOR COMPOSITE-TYPE VIBRATION-DAMPING MATERIAL, COMPOSITE-TYPE VIBRATION-DAMPING MATERIAL USING THE RESIN COMPOSITION AND PROCESS FOR PRODUCTION OF THE VIBRATION-DAMPING MATERIAL

[75] Inventors: Yasunobu Uchida; Tomoshige Ono; Tadahiro Wakui; Yoshihiro Matsumoto; Masatoshi Shinozaki, all of Chiba; Toshio Okuyama, Nagoya; Toshiro Hirose, Nagoya; Toru Uno, Nagoya, all of Japan

[73] Assignees: Kawasaki Steel Corporation; Toagosei Chemical Industry Co., Ltd., both of Japan

[21] Appl. No.: 482,563

[22] Filed: Feb. 21, 1990

[30] Foreign Application Priority Data

Feb. 22, 1989 [JP] Japan ................................. 1-42296
Mar. 10, 1989 [JP] Japan ................................. 1-58611

[51] Int. Cl.$^5$ .......................................... C08G 18/80
[52] U.S. Cl. ..................................................... 528/45
[58] Field of Search ................. 528/45; 428/423.1; 264/165

[56] References Cited

U.S. PATENT DOCUMENTS 3,616,113 10/1971 Sawyer ................................. 161/39
3,840,810 4/1974 Fryd ..................................... 260/75
4,035,548 7/1977 Chang et al. ....................... 428/412
4,731,392 3/1988 Streu et al. ........................... 528/83

FOREIGN PATENT DOCUMENTS

3835607A1 5/1989 Fed. Rep. of Germany .
61-258743 6/1986 Japan .
63-48321 3/1988 Japan .
64-48813 2/1989 Japan .
1-188331 6/1989 Japan .

OTHER PUBLICATIONS

Chemical Abstracts, vol. 109, No. 10, Sep. 1988, p. 66, Abstract No. 74846w.

Primary Examiner—Maurice J. Welsh
Attorney, Agent, or Firm—Austin R. Miller

[57] ABSTRACT

A resin composition for a composite-type vibration-damping material which comprises a saturated copolyester having a weight average molecular weight of at least 10,000 and a softening point of 50° to 150° C. and a polyfunctional isocyanate compound as a cross-linking agent and which, when cross-linked, has a degree of gelation (degree of cross-linking) of at least 10% and a composite-type vibration-damping material produced by use of the resin composition, have excellent adhesive strength and formability.

When the resin composition is admixed with a conductive substance, a vibration-damping material produced by use of the admixture has excellent spot-weldability in addition to the above-mentioned excellent properties.

24 Claims, 4 Drawing Sheets

RESIN COMPOSITION FOR COMPOSITE-TYPE VIBRATION-DAMPING MATERIAL, COMPOSITE-TYPE VIBRATION-DAMPING MATERIAL USING THE RESIN COMPOSITION AND PROCESS FOR PRODUCTION OF THE VIBRATION-DAMPING MATERIAL

BACKGROUND OF THE INVENTION (1.) Field of the Invention

This invention relates to a resin composition used for a vibration-damping material such as a composite-type vibration-damping steel sheet comprising a resin layer provided between two steel sheets, a composite-type vibration-damping material using the resin composition, a composite-type vibration-damping material having spot weldability, and process for production thereof. Particularly, the invention relates to a composite-type vibration-damping material having an excellent vibration-damping effect at or around normal temperature, as well as high adhesion performance, a resin composition which enables the production of a composite-type vibration-damping material having spot weldability in addition to the above-mentioned properties, a composite-type vibration-damping material using the resin composition, and process for production thereof. The composite-type vibration-damping material thus obtained can be used as a noise and vibration-reducing material. The composite-type vibration damping material is applicable, as noise and vibration-reducing material, not only to building material for stairways, doors, floor materials, etc., but to automotive oil pan, dashboard, floor panel, roof panel and other trim parts, to which the conventional composite-type vibration-damping materials could not be easily applied. Also, the composite-type vibration-damping material according to this invention can be used for motor and compressor covers, etc. Thus, the composite-type vibration-damping material according to the invention can be used widely in the automobile industry, civil engineering and construction industries as well as electrical machinery industry.

(2.) Description of the Prior Art

A composite-type vibration-damping steel sheet is a noise and vibration-reducing material which comprises a layer of a viscoelastic resin (hereinafter referred to as "the intermediate resin") provided between two steel sheets so that vibrations exerted on the steel sheets are converted into thermal energy by the intermediate resin layer. The use of the composite-type vibration-damping steel sheets for automotive oil pans, stairways, doors, floor material or other building materials, motor or compressor covers, etc., has been made or investigated, in view of the recent needs for noise control.

Generally, the vibration-damping performance of such a composite-type vibration-damping material depends on the performance of the intermediate resin layer. It is known that the vibration-damping performance, represented by loss factor ($\eta$), shows a peak at a specific temperature, and the vibration-damping material produces its greatest effect when used in the vicinity of the peak characteristic temperature.

The vibration-damping performance is not only temperature-dependent but is dependent on the frequency of the source of noise or vibration. Generally, the loss factor is higher as the frequency is higher.

For use as the intermediate resin in the vibration-damping steel sheet, a variety of materials have been studied, for instance, polyurethane (Japanese Patent Application Laid-Open (KOKAI) No. 47-19277 (1972)), vinylurethane resin (Japanese Patent Laid-Open (KOKAI) No. 50-39737 (1975), polyester resin (Japanese Patent Application Laid-Open (KOKAI) No. 50-143880 (1975)), polyamide resin (Japanese Patent Application Laid-Open (KOKAI) No. 51-79146 (1976)), polyisobutylene (Japanese Patent Application Laid-Open (KOKAI) No. 54-43251 (1979)), ethylene/$\alpha$-olefin resin (Japanese Patent Application Laid-Open (KOKAI) No. 55-84655 (1980)), EVA (Japanese Patent Application Laid-Open (KOKAI) No. 57-34949 (1982)), crosslinked polyolefin (Japanese Patent Application Laid-Open (KOKAI) No. 59-152847 (1984)), polyvinyl acetal (Japanese Patent Application Laid-Open (KOKAI) No. 60-88149 (1985)), etc. Besides, it has been known that asphalt, synthetic rubbers, acrylic adhesives, epoxy resins and the like also have a vibration-damping property. Of these materials, the resins elastic at room temperature, such as acrylic adhesives, isobutylene rubber, EVA, etc., have comparatively high vibration-damping properties at temperatures near normal temperature. These elastic resins however, are poor in adhesive strength due to their low cohesive force at normal temperature, so that the vibration-damping steel sheets using the resins are incapable of enduring press forming and processing. Further, vibration-damping steel sheet materials subjected to press working may be subsequently subjected to a baking finish step in which they are heated to about 200° C. Thus, it is necessary that the intermediate resin should not flow out in the vicinity of the temperature and, also, the lowering in the adhesive strength should be little. Therefore, the above-mentioned vibration-damping steel sheets, naturally lacking such a heat resistance, have been applied only to building material uses where they have been used in substantially flat forms.

On the other hand, polyolefin resins modified by copolymerization, blending or the like, for instance, ethylene/$\alpha$-olefin resins, are comparatively better in vibration-damping property at higher temperature of 50° to 100° C. and stronger in cohesive force at normal temperature, as compared with the above-mentioned elastic resins, and are able to endure press forming and processing. Therefore, the vibration-damping steel sheets using the modified polyolefin resin have been said to be suitable for application to high-temperature uses, such as automotive oil pans.

However, the above-mentioned resins (and the vibration-damping steel sheets using them) are still unsatisfactory in the vibration-damping performance and adhesion performance. Moreover, there has not yet been, found out any resin that is suitable for a vibration-damping steel sheet required to have a high vibration-damping performance at or around normal temperature, furthermore to have a high vibration-damping performance even in a low frequency region, as in application to automotive trim parts, and to show strong adhesion during and after the press forming and processing thereof as well as good heat resistance of adhesion at high temperatures.

Use of polyester resin as the resin for a vibration-damping steel sheet has hitherto been studied. Examples of the studies include the following:

(1) a so-called urethane foam obtained by preparing a urethane prepolymer from a polyester resin of a molecular weight of up to 1800 and an isocyanate compound, and using an amine compound or the like as a curing agent (Japanese Patent Application Laid-Open (KOKAI) No. 47-19277 (1972));

(2) a polyester resin having a glass transition temperature of 0° to 60° C., prepared from a glycol and a phthalic acid (Japanese Patent Application Laid-Open (KOKAI) No. 50-143880 (1975);

(3) a polyester resin having a specified elongation and a specified peak temperature of loss factor (Japanese Patent Application Laid-Open (KOKAI) No. 61-277435 (1986));

(4) a mixture of a polyester resin and a polyolefin resin (Japanese Patent Application Laid-Open (KOKAI) No. 61-89842 (1986));

(5) a composition obtained by blending two amorphous polyester resins differing in composition (Japanese Patent Application Laid-Open (KOKAI) No. 62-295949 (1987));

(6) a composition comprising a polyester diol (A) which has a molecular weight of 600 to 6000 and in which at least 60 mol % of the dicarboxylic acid component comprises an aromatic dicarboxylic acid component and glycol, an aliphatic polyester diol (B) having a molecular weight of 600 to 6000, and a diisocyanate compound (Japanese Patent Application Laid-Open (KOKAI) No. 63-48321 (1988));

(7) a composition comprising a polyester diol (A) which has a molecular weight of 600 to 6000 and in which at least 60 mol % of the dicarboxylic acid component comprises an aliphatic dicarboxylic acid of 4 to 20 carbon atoms, a chain extender (B) having a molecular weight of up to 400, and a diisocyanate compound (Japanese Patent Application Laid-Open (KOKAI) No. 63-202613 (1988)); and (8) a composition comprising an amorphous polyester having a maximum of loss tangent (tan$\delta$) of at least 0.5 in the temperature range of from −40° to 120° C., an acid anhydride, and an epoxy compound (Japanese Patent Application Laid-Open (KOKAI) No. 63-75056 (1988)).

However, the urethane foam of (1) above is poor vibration-damping properties, and is unsatisfactory in adhesion performance.

The resin of (2) is insufficient in adhesion performance at normal temperature, and lacks heat resistance and durability, for instance at about 100° C. Thus, neither of the resins of (1) and (2) has satisfactory performance as a resin for a vibration-damping material.

The resin materials of (3), (4) and (5) above show high vibration-damping properties in specified temperature ranges in which they are viscoelastic, but their cohesive forces are insufficient. Therefore, the resin materials are poor in adhesive force even at temperatures at which they show practical vibration-damping properties, and, at a higher temperature, they naturally cannot have satisfactory strength. Thus, none of the resin materials of (3), (4) and (5) have satisfactory performance as a resin for a vibration-damping material.

The resin composition of (6) overcomes the above-mentioned drawback of insufficient cohesive force, and shows a comparatively high adhesive strength and loss factor. However, the temperature corresponding to the maximum vibration-damping performance of the resin composition is so high that the vibration-damping property at around normal temperature is not good, and the resin composition does not have sufficient performance as a resin for a vibration-damping material which produces the desired effect in the vicinity of normal temperature, especially in the vicinity of normal temperature as well as in a low-frequency region. Furthermore, the resin composition shows remarkable drop in adhesion strength after painting and baking at about 200° C.

The resin composition of (7) has a high vibration-damping property at or around normal temperature. Due to the low molecular weights of the components (A) and (B) and to the aliphatic materials constituting the resin composition, the resin composition is insufficient in adhesion performance at normal temperature, and lacks resistance to hydrolysis. Further, the resin composition shows a marked reduction in adhesive force when exposed to a high temperature, for instance about 200° C., and is not capable of satisfactory use as a resin for a vibration-damping material.

The resin composition of (8) is shown to have high adhesive strength and vibration-damping property at around normal temperature. However, there is a description that when the amorphous polyester resin is used solely or with an isocyanate crosslinking agent, it is difficult to achieve a high adhesive strength under shear, which has an important effect on press-workability. Therefore, resin compositions comprising the polyester and the isocyanate crosslinking agent have not yet reached a satisfactory level of usability as a resin for a vibration-damping material.

In short, in composite-type vibration-damping materials produced by use of the conventional intermediate resins mentioned above, the resins do not function satisfactorily as a resin for a vibration-damping material which exhibits high vibration-damping performance particularly at around normal temperature and which has high adhesion and durability, furthermore which exhibits high vibration-damping performance against vibrations in a low-frequency region.

SUMMARY OF THE INVENTION

This invention contemplates overcoming the above-mentioned problems involved in the prior art.

It is accordingly an object of this invention to provide a resin composition for a composite-type vibration-damping material which has high vibration-damping performance at or around normal temperature, specifically at temperatures of 0° to 50° C., and furthermore has high vibration-damping performance even in a low-frequency region, has excellent adhesion performance maintained during and after press forming and processing steps, has high thermal stability at high temperatures, specifically 100° C. or above, and also has good lamination properties.

It is another object of this invention to provide a composite-type vibration-damping material using the resin composition.

It is a further object of this invention to provide a composite-type vibration-damping material capable of being spot welded.

It is yet another object of this invention to provide a process for producing the composite-type vibration-damping materials.

The present inventors have made studies for achieving the above-mentioned objects, and as a result of their studies, have found out that when a resin composition which comprises a specified saturated copolyester and a polyfunctional isocyanate compound and which, when cross-linked, has a degree of gelation (degree of cross-linking) of at least 10% is used and, further, a specified conductive substance is used, it is possible to obtain a composite-type vibration-damping material having extremely excellent characteristics.

According to a first aspect of this invention, there is provided a resin composition for a composite-type vibration-damping material which comprises a saturated copolyester having a weight average molecular weight of at least 10,000 and a softening point of 50° to 150° C. and a polyfunctional isocyanate compound and which, when cross-linked, has a degree of gelation (degree of cross-linking) of at least 10%.

According to a second aspect of this invention, there is provided a resin composition for a composite-type vibration-damping material comprising a composition which comprises a saturated copolyester having a weight average molecular weight of at least 10,000 and a softening point of 50° to 150° C. and a polyfunctional isocyanate compound and which, when cross-linked, has a degree of gelation (degree of cross-linking) of at least 10%, the resin composition further comprising a conductive substance.

According to a third aspect of this invention, there is provided a composite-type vibration-damping material comprising an intermediate resin layer which comprises a saturated copolyester having a weight average molecular weight of at least 10,000 and a softening point of 50° to 150° C. and a polyfunctional isocyanate compound and which has a degree of gelation (degree of cross-linking) of at least 10%.

According to a fourth aspect of this invention, there is provided a composite-type vibration-damping material comprising an intermediate layer of a mixture of a resin composition with a conductive substance, the resin composition comprising a saturated copolyester having a weight average molecular weight of at least 10,000 and a softening point of 50° to 150° C. and a polyfunctional isocyanate compound, the resin composition having a degree of gelation (degree of cross-linking) of at least 10%, the conductive substance having a diameter of at least 0.5 times the thickness of the resin layer.

According to a fifth aspect of this invention, there is provided a process for producing a composite-type vibration-damping material which comprises the step of providing, between sheet materials, a mixture obtained by mixing a saturated copolyester having a weight average molecular weight of at least 10,000 and a softening point of 50° to 150° C. with a polyfunctional isocyanate compound so that the mixture, when cross-linked, has a degree of gelation (degree of cross-linking) of at least 10%.

According to a sixth aspect of this invention, there is provided a process for producing a composite-type vibration-damping material which comprises the step of providing, between sheet materials, a mixture obtained by mixing a saturated copolyester having a weight average molecular weight of at least 10,000 and a softening point of 50° to 150° C. with a polyfunctional isocyanate compound so that the mixture, when cross-linked, has a degree of gelation (degree of cross-linking) of at least 10%, and mixing a conductive substance into the mixture of the saturated copolyester and the polyfunctional isocyanate compound.

In this invention as above-mentioned, the polyfunctional isocyanate compound may be a polyisocyanate compound having at least three isocyanate groups, especially a polymerized polyisocyanate compound.

It is preferable that the saturated copolyester has a weight average molecular weight of 20,000 to 50,000.

It is preferable that the degree of gelation (degree of cross-linking) of the composition cross-linked is 10 to 80%, especially 20 to 60%.

DETAILED DESCRIPTION OF THE INVENTION

Figure 1:
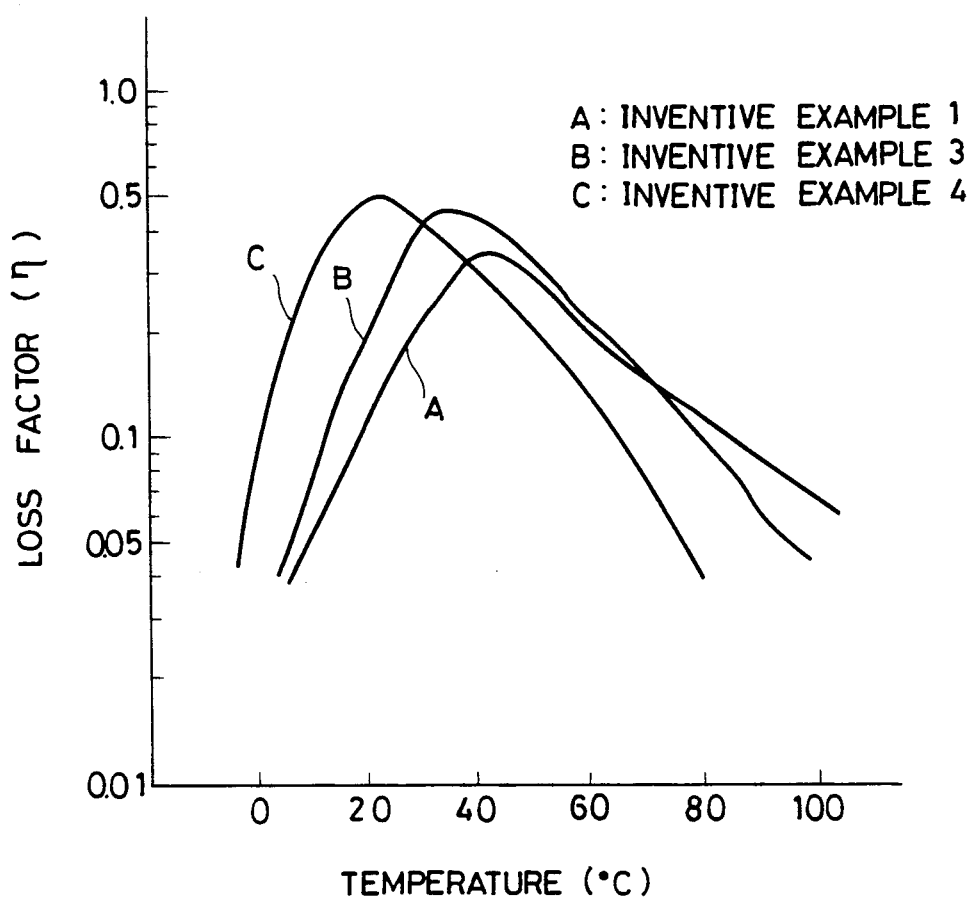
FIG. 1 is a diagram showing the measurement results of loss factor, at a frequency of 1000 Hz, of vibration-damping steel sheets produced by use of a resin composition according to this invention, in which A, B and C denote the measurement results of loss factor for Inventive Examples 1, 3 and 4 in Example 1, respectively.

This invention will now be described in more detail below.

The vibration-damping material according to this invention is a material comprising the resin detailed below as an intermediate layer, in which the outer components of the vibration-damping material include a wide variety of materials such as cold-rolled steel sheet, carbon steel sheet, high tensile steel sheet, stainless steel sheet, aluminum sheet, copper sheet, alloy sheet, and surface-treated material plated or chromate-treated thereto, etc., and the shape of the vibration-damping material is not limited to a flat platelike shape but include a wide variety of shapes such as cut sheet, coil, and worked pieces in a desired shape formed for example by any press machine, etc.

(A) Saturated Copolyester Resin

The saturated copolyester resin used in this invention includes a saturated copolyester resin having a softening point of 50° to 150° C., as measured according to the ring and ball softening point method (JIS-K-2531). If the softening point is below 50° C., contamination or surface tackiness troubles would occur at the time of processing due to the outflow of the resin at the time of a laminating and adhering step or due to the tackiness of the resin. If the softening point is above 150° C., on the other hand, a high temperature would be required at the time of lamination by heating, and the adhesion performance itself would be low.

In this invention, the softening point of the saturated copolyester resin is preferably 80° to 120° C.

The molecular weight of the resin, in terms of weight average molecular weight determined on a polystyrene basis by gel permeation chromatography, is at least 10,000. If the molecular weight is less than 10,000, there would arise the problems of lower vibration-damping performance, poor adhesion performance, outflow of the resin at the time of laminating, an extremely low strength immediately after adhesion, etc. In the invention, the weight average molecular weight of the resin is preferably 20,000 to 50,000.

The saturated copolyester comprises a polyester comprising an aromatic dibasic acid such as dimethylterephthalic acid, terephthalic acid, isophthalic acid, phthalic acid, etc., an aliphatic dibasic acid such as succinic acid, glutaric acid, adipic acid, β-methyladipic acid, pimelic acid, 1,6-hexanedicarboxylic acid, azelaic acid, sebacic acid, nonanedicarboxylic acid, decanedicarboxylic acid, hexadecanedicarboxylic acid, etc., and a glycol such as ethylene glycol, 1,2-propanediol, 1,3-propanediol, 1,3-butanediol, 1,4-butanediol, 1,2-pentanediol, 1,5-pentanediol, 3-methylpentanediol, 1,3-hexanediol, 1,6-hexanediol, 1,4-cyclohexane diol, hydrogenated bisphenol A, diethylene glycol, triethylene glycol, polyethylene glycol., dipropylene glycol, polypropylene glycol, polytetramethylene glycol, etc., or a polyester comprising residue-forming derivative of such glycol, or caprolactone.

The saturated copolyester preferable in this invention comprises a terephthalic acid residue in an amount of 30 to 90 mol % based on the total amount of the acid components. A polyester in which the amount of terephthalic acid residue is less than 30 mol % has an insufficient cohesive force, and may cause troubles at the time of working due to a low adhesive strength or an unsatisfactory strength immediately after a laminating and adhering step. A polyester in which the amount of terephthalic acid residue is more than 90% is also unfavorable because of the possibility of adhesion performance being lowered.

The dibasic acids capable of being jointly used when the terephthalic acid residue is used in an amount in the above-mentioned range include the above-mentioned aromatic or aliphatic dibasic acids, a preferable example being at least one aliphatic dibasic acid, particularly, adipic acid or sebacic acid.

The glycol component preferably contains an ethylene glycol residue in an amount of 30 to 80 mol %. If the amount of the ethylene glycol residue is less than 30 mol %, adhesion performance would be low, whereas if the amount exceeds 80 mol %, the adhesion performance would be lowered and, further, it might be impossible to obtain good vibration-damping performance. A more preferable range of the amount of the ethylene glycol residue is from 40 to 70 mol %.

The glycol components which can be jointly used when the ethylene glycol residue is used in an amount in the above-mentioned range include the above-mentioned glycols, a preferable example being hexanediol or other similar glycol having 6 carbon atoms or a polyoxyalkylene glycol such as polyethylene glycol, polytetremethylene glycol, etc.

As the saturated copolyester in this invention, a polyester obtained by copolymerization of, for instance, an unsaturated fatty acid such as maleic acid, fumaric acid, dimer acid, etc., a fatty acid having a functional group of more than two, such as trimellitic acid, or a hydroxyl-containing compound having a functional group of more than two, such as trimethylolpropane, pentaerythritol, etc., may be used. These monomers, however, might lower the adhesion performance, impair the durability of adhesion or lower the vibration-damping performance itself. It is therefore preferable to use these monomers in such amounts as not to spoil the characteristic features of this invention.

The saturated copolyester in this invention preferably has a glass transition temperature-of not higher than 20° C., as measured by a viscoelastic spectrometer. If the glass transition temperature is above 20° C., vibration-damping performance in the vicinity of normal temperature will be low, and adhesion performance may be lowered. More preferably, the glass transition temperature is 0° C. or below.

In consideration of workability in laminating the vibration-damping material, it is preferable that the saturated copolyester in this invention is soluble in general-purpose solvents such as toluene, MEK, ethyl acetate, etc. Dissolving the saturated copolyester in a solvent facilitates application of the resin composition of this invention to a sheet material, prevents the involvement of gases into the portion being laminated, and makes it easy to mix a conductive powder, which is required for imparting spot-weldability for working, filler, additive, etc. into the resin composition.

(B) Synthesis of Saturated Copolyester

The saturated copolyester for use in this invention can be synthesized by the usual method. Generally, the saturated copolyester can be synthesized by a method comprising subjecting the above-mentioned dibasic acids and glycol to an esterification reaction, followed by an ester exchange reaction carried out with distilling off excess glycol under a reduced pressure at a high temperature, or by a method in which a polyethylene terephthalate, polybutylene terephthalate or the like synthesized beforehand is subjected to depolymerization in the presence of desired dibasic acids and an excess of glycol, followed by an ester exchange reaction. For example, a saturated copolyester having a high molecular weight can be synthesized by subjecting the dibasic acids and glycol, as main raw materials, to esterification with heating to a temperature of 150° to 220° C. under normal pressure in the presence of a catalyst comprising a metallic salt, thereby forming an oligoester, and subsequently heating the system to a temperature of 200° to 270° C. under normal or reduced pressure to distill off excess glycol. In carrying out the synthesis, it is preferable to add the glycol in an amount of 1.5 to 2 times the amount thereof in the polyester composition desired. The composition of the polyester formed is controlled through determination of the molar ratio of monomer residues by $^1$H-NMR. A catalyst for the polymerization is selected appropriately from those ordinary catalysts which comprise a metallic salt such as tetra-n-butoxytitanium, zinc acetate, antimony trioxide, potassium titanate oxalate, etc.

(C) Polyfunctional Isocyanate Compound

The polyfunctional isocyanate compounds usable in this invention include compounds having at least two isocyanate groups in the molecule thereof, for example, 2,4-tolylene diisocyanate, 2,6-tolylene diisocyanate (generally called "TDI"), methylene-bis(4-phenyl isocyanate) (generally called "MDI"), MDI derivatives such as polymethylene polyphenyl polyisocyanate, polyol-modified MDI, etc., hexamethylene diisocyanate (generally called "HDI") and derivatives thereof, isophorone diisocyanate (generally called "IPDI") and derivatives thereof, TDI adduct polyisocyanate obtained by addition of TDI to trimethylolpropane or the like, such as the commercial products available under the trade names Coronate L, Coronate HL (these two are products by Nippon Polyurethane Industry Co., Ltd.), Desmophen L and Desmodur N (Sumitomo Bayer Urethane Co., Ltd.), preliminarily polymerized polyisocyanates, such as trimerized TDI, pentamerized TDI and its derivatives, and such as the commercial products available under the trade names Suprasec 3240 and 3250, Coronate 2030 and 2031(Nippon Polyurethane Industry Co., Ltd.), Desmodur IL and HL (Sumitomo Bayer Urethane Co., Ltd.), blocked isocyanates obtained by masking an isocyanate with caprolactam or the like, isocyanate-terminated prepolymers obtained by reacting a low molecular weight polyether with the above-mentioned polyfunctional isocyanate, etc. While any of the above compounds can be used as the polyfunctional isocyanate compound, those which are preferable for use in this invention are a polyisocyanate having at least three isocyanate groups, for example, adduct polyisocyanate and polymerized polyisocyanate, in view of their remarkable effect of enhancing adhesive properties. Especially, the polymerized polyisocyanate may render a high heat resistance.

As a resin composition for a vibration-damping material, the degree of gelation (degree of cross-linking) of the cross-linked reaction product between the saturated copolyester and the polyfunctional isocyanate compound should be at least 10%. A degree of gelation (degree of cross-linking) of less than 10% leads to insufficient adhesive force (peel strength in shear), unsatisfactory heat resistance after laminating, and a lower vibration-damping performance.

The resin composition of the invention may render a high vibration-damping characteristic, and furthermore, selection of the degree of gelation of from 10 to 80% would reach better vibration-damping characteristic especially in a low-frequency region less than 500 Hz.

A more preferable range of the degree of gelation (degree of cross-linking) is from 20 to 60%.

In order to achieve such a degree of gelation, the amount of the polyfunctional isocyanate compound added to the saturated copolyester is preferably 0.5 to 10 equivalents per 1 equivalent of the hydroxyl group in the saturated copolyester calculated from the weight average molecular weight. Such amount of 0.5 to 10 equivalents is more preferable. Furthermore, such amount of 0.5 to 5 equivalents is more preferable. If the amount of the polyfunctional isocyanate compound added is less than 0.5 equivalent, there might result insufficient adhesion performance, insufficient heat resistance after laminating, and a lower vibration-damping performance. If the amount exceeds 10 equivalents, on the other hand, the reaction would proceed excessively, thereby making it difficult to control the degree of gelation, and lower durability after lamination and insufficient vibration-damping characteristic might occur.

The use of pre-reacted products of a part of the polyfunctional isocyanate with said polyester will enhance the effects of the present invention.

(D) Other Additives

A variety of additives can be jointly used in the resin composition according to this invention. Examples of the additives usable include polyesters other than the saturated copolyester constituting the resin of the invention, hydroxyl-terminated acrylic resins, epoxy resins such as bisphenol epoxy resin, cresol-novolak epoxy resin, etc., styrene resins such as polystyrene resin, poly-α-methylstyrene resin, etc., tackifiers such as terpene resins, terpene phenol resins, rosin resins, hydrocarbon resins, aromatic resins, phenolic resin, etc., cross-linking agents such as polyalkylene glycol polyester plasticizers, melamine resins, organofunctional silane (generally called "silane coupling agent"), a peroxide, etc., catalysts for cross-linking of isocyanate such as a metallic salt (e.g., n-butyltin dilaurate), amine, glycol, etc., chain extender, etc. Also, inorganic filler such as calcium carbonate, talc, Hardsil ("Hardsil" is a trade name for clay), etc. can be added to the resin composition of this invention in such amounts as not to spoil the characteristic features of the invention.

Besides, a conductive solid substance can be blended as a filler into the above-mentioned composition, in order to impart electrical conductivity to the composition, thereby causing the vibration-damping material obtained to be a spot-weldable material. The conductive substances usable for the purpose include, for example, metallic materials prepared in a powdery, flaky, fibrous, wirelike or other form from a metal such as stainless steel, zinc, copper, tin, brass, nickel, etc., iron metals plated with copper, nickel or the like, conductive carbon substances such as carbon black, graphite, carbon fiber, etc. At least one of these substances may be used either singly or in combination.

Among the conductive substances, the metallic substances are preferred, from the viewpoint of development of good conductivity. Let the maximum particle diameter of a powdery metallic substance, the maximum thickness of a flaky metallic substance and the maximum diameter of a fibrous or wirelike metallic substance be the representative length (L) for the respective cases of the form of metallic substance, then it is recommendable that the ratio (L)/(T) of the representative length (L) to the thickness (T) of the intermediate resin layer is controlled to be at least 0.5, preferably, at least 0.8, in order to develop good conductivity. If the ratio (L)/(T) is less than 0.5, spot welding performance would be lowered.

Moreover, the amount of the conductive substance used as filler is preferably 0.5 to 10% by volume. If the amount is less than 0.5% by volume, spot welding properties would be low, whereas if the amount exceeds 10% by volume, adhesion performance or vibration-damping performance would be lowered, though satisfactory spot welding properties would be obtained. A more preferable amount of the conductive substance is from 1 to 5% by volume.

(E) Application to Vibration-Damping Material

The material to which the resin composition of this invention is applied for producing a vibration-damping material may be any of cold-rolled steel plate (generally called "SPCC"), a surface-treated steel sheet such as chromate-treated steel sheet, zinc or zinc alloy-plated steel sheet, phosphate-treated steel sheet, etc., copper sheet, aluminum sheet, stainless steel sheet, etc., and the sheet may be in the form of a coiled strip or in the form of a cut sheet. The thickness of the sheet is preferable 0.3 to 2 mm, in consideration of capability of press forming and processing, and shape retention property.

The resin composition comprising the saturated copolyester and the polyfunctional isocyanate compound is generally used in the same manner as a two-pack type adhesive comprising a so-called main agent and a cure agent, that is the saturated copolyester and the polyfunctional isocyanate compound are stored separately, and are mixed with each other when used for producing a vibration-damping material.

More specifically, for instance, the resin composition may be used as an extruded film obtained through melting by heating, mixing and extrusion, or as a so-called cast film obtained by mixing the components of the composition in a solvent, coating a release sheet with the resultant mixture and distilling off the solvent. The resin composition in such a film form may be laid between two material sheets, and the assembly may be subjected to an adhering process by heated roll or, a hot press or, subsequently, to a laminating and adhering step by cooling rolls or a cooling press. It is preferable, however, to mix the predetermined saturated copolyester, isocyanate and additives with each other in a solvent, apply the resultant mixture to a laminating surface of at least one, preferably both, of the material sheets, distill off the solvent at room temperature or by heating to a temperature of 100° to 150° C., and, subsequently to the solvent removal or after leaving the assembly to stand for a while, subject the assembly to a laminating and adhering step with heating. The method of coating a resin composition solution is not limited, but may be preferably conducted by use of roll coater, spray, curtain flow coater, doctor knife coater and the like. It is preferable that the film thickness of the resin is controlled to be 1/50 to 1/5 times the thickness of the steel sheet, and is substantially 20 to 150 μm. If the film thickness is less than 20 μm, vibration-damping performance and adhesion performance would be low, whereas a film thickness of more than 150 μm might cause slippage or cracking the sheet material during a press forming and processing step.

As for the laminating and adhering temperature, it is generally required only to heat the resin layer at 130° to 250° C. The contact time may be about 10 seconds to 2 minutes in the case of a hot press, and about 0.5 to 10 seconds in the case of heated rolls. A method of heating the material sheets to the same temperature beforehand and carrying out the laminating and adhering process by use of a cooling press or cooling rolls may also be used.

Thus, the resin composition according to this invention is characterized by the heat resistance above the adhering temperature obtained under the same working conditions as for thermoplastic resins, and by the predetermined adhesion performance being obtained immediately after the laminating and adhering step. The resin of this invention is characterized also by a practically satisfactory pot life of the materials to be applied to the sheet materials.

With the resin composition capable of being applied in the state of a solution at the time of laminating, it is possible to enhance the adhesion between the sheet materials and the resin, to prevent the involvement of gases into the portion being laminated, and also to facilitate the addition of the conductive metallic powder, carbon or the like added for the purpose of providing the formed sheet material with spot-weldability. This process, therefore, is the most preferred process for this invention, and can be realized easily by use of the saturated copolyester according to the invention.

Saturated copolyesters, due to their sharp melting behavior, show their own viscoelasticity only in a narrow temperature range, and show insufficient cohesive force in the temperature range in which the viscoelasticity is exhibited. Therefore, the saturated copolyesters are poor in adhesive strength even at a temperature at which vibration-damping property is practically exhibited, and do not have sufficient strength at temperatures above that temperature. It is natural that the saturated copolyesters have not been able to be used as a resin for a vibration-damping material.

The present inventors have made it possible to provide, by using a specified saturated copolyester and a polyfunctional isocyanate compound and controlling the degree of gelation to within the range of 10 to 80%, a vibration-damping material which has high vibration-damping performance, namely, a high value of loss factor, in the vicinity of normal temperature, has a wide temperature range for use thereof, has excellent adhesion performance necessary at the time of press forming and processing thereof, and is extremely excellent in stability of adhesion under high temperatures after the press forming and processing, resistance to chemicals, and durability, and furthermore exhibits the effect in a low-frequency region.

Besides, the resin composition according to this invention can be laminated with two material sheets without need for a long heating time, as in the cases of reaction-type resins such as two-pack polyurethane, comprising an ordinarily liquid low-molecular-weight polyester or polyether and an isocyanate compound, or a curable-type epoxy resin. Further, the resin of the invention can be used without the problem of outflow of resin at the time of the laminating and adhering step, and without the need for high laminating temperature, laminating pressure and the like which are indispensable in the case of adhesion by utilizing the thermoplastic property of a resin (e.g., polyurethane resin, modified polyolefin resin) itself because it is requisite for such a resin to have a melting point higher than the temperatures to which the resin is exposed in use. The resin of this invention shows a high adhesive strength even at a laminating temperature lower than the practical-use temperature, and has extremely excellent workability.

Furthermore, it has become possible to provide a vibration-damping material having a high spot-weldability in addition to the above-mentioned properties, by blending a specified conductive substance into the resin composition of this invention.

EXAMPLES

This invention will now be explained concretely while referring to the following nonlimitative examples.

For Examples 1 to 3, the following methods were used for measurement of properties of polyester, for laminating and adhering, for measurement of properties of vibration-damping sheets, and so on.

(1) Softening point of polyester

The softening point was measured by the ring and ball method according to JIS-K-2531, and represented in ° C.

(2) Weight average molecular weight of polyester

Each polyester resin was dissolved in tetrahydrofuran, and the solution was subjected to gel permeation chromatographic analysis to calculate the weight average molecular weight of the resin on a polystyrene basis.

(3) Glass transition temperature of polyester

Each polyester was formed into a 1 mm thick sheet, which was subjected to measurement of dynamic elastic modulus ($E'$) by a viscoelastic spectrometer (10 Hz), and the temperature at which the elastic modulus started to decrease was presented.

(4) Amount of polyfunctional isocyanate compound added, in parts by weight and in equivalents The number of equivalents of isocyanate groups of each polyfunctional isocyanate compound was calculated based on the amount of the polyfunctional isocyanate compound added per 100 parts by weight of the polyester and the amount of terminal hydroxyl groups determined from the weight average molecular weight of the polyester.

(5) Steel sheet used

Cold-rolled steel sheets (SPCC-SD) 0.6 mm in thickness were used, after degreasing.

(6) Process for laminating and adhering

A polyester was preliminarily dissolved in a toluene-MEK mixed solvent to prepare a solution with a solids content (nonvolatile content) of 30%. The solution was mixed with a polyfunctional isocyanate compound. Each steel sheet was coated on one side thereof with the mixture by a roll coater so as to obtain a resin film thickness of 25 μm, and the solvent was distilled off in an oven (100° C.×1 min). Then, the resin-coated surfaces of the steel sheets were brought into contact with each other, and the resultant assembly was subjected to adhesion with heating by a hot press (200° C.×1 min×5 kg/cm$^2$). Then, the laminated products were evaluated as follows.

(7) Adhesion performance

Each laminated and adhered product obtained as above was cut to a 25 mm width. The specimens thus obtained were subjected to measurement of T-peel strength at a rate of pulling of 200 mm/min. Similarly, the adhered portion was cut to a piece 25 mm×25 mm in area. The specimens thus obtained were subjected to measurement of tensile shear strength at a rate of pulling of 10 mm/min at room temperature, 23° C.

(8) Formability

The laminated and adhered product obtained as above was cut to a piece 25 mm in width by 100 mm in length. The specimens thus obtained were bent to 4 mmφ. The specimens showing a lifting at the bent portion were marked X, whereas the specimens showing no change were marked ◯. Similarly, specimens showing a lifting after 24 hour immersion in boiling water or after 24 hour heating at 150° C. in an oven were marked X, and specimens showing no change after the immersion were marked ◯.

(9) Vibration-damping performance

Vibration-damping performance was evaluated by measuring the loss factor ($\eta$) of each laminated and adhered product by a mechanical impedance method, and representing the performance by temperature dependency of the loss factor at 1000 Hz (and also at 500, 250 and 80 Hz in Example 2).

(10) Thermal stability

Thermal stability was evaluated by cutting each laminated and adhered product to prepare specimens 25 mm wide and specimens 25 mm×25 mm in area, placing the specimens for one hour in hot-air circulation type ovens set at 180° C., 200° C. and 220° C., respectively, and then subjecting the specimens to measurement of adhesive strength by the same method as in (7).

(11) Spot-weldability

Each specimen was subjected to direct spot welding which comprised 8 cycles of passage of a welding current of 8 KA applied between spherically shaped 8R electrode tips under a welding pressure of 200 kgf. The specimens having been welded were evaluated as good, whereas the specimens which did not show any passage of current were evaluated as bad.

(12) Degree of gelation

Degree of gelation was calculated from the amount of an intermediate resin remaining after a steel sheet including the resin, obtained by stripping the steel sheets of each laminated and adhered product, was extracted for 24 hours with acetone in a Soxhlet extractor.

EXAMPLE 1

As Inventive Example 1, a polyester comprising, on a relative amount basis, 80 moles of terephthalic acid residue, 20 moles of adipic acid residue, 45 moles of ethylene glycol residue and 55 moles of 1,6-hexanediol residue and having a weight average molecular weight of 23000, a softening point of 120° C. and a glass transition point of −10° C. was synthesized by the usual method. The polyester was dissolved in a 1:1 (by weight) mixture of toluene and MEK so as to have a solids content (nonvolatile content) of 30%, and the resultant solution was admixed with a polymeric polyisocyanate Coronate 2030 (NV: 50%; NCO%: 7.9, a product by Nippon Polyurethane Industry Co., Ltd.) in an amount of 8 parts by weight per 100 parts by weight of the polyester. The admixture thus obtained was applied to two steel sheets, and, after drying, the coated steel sheets were laid on each other and adhered in the laminated condition by a hot press. In this case, the amount of isocyanate groups was 1.7 equivalents per 1 equivalent of terminal hydroxyl groups of the polyester. The thus laminated steel panel was subjected to measurement of adhesion performance, formability and loss factor at a frequency of 1000 Hz, the results being shown as Inventive Example 1 in Table 1 and FIG. 1, while the measurement results of thermal stability are shown also as Inventive Example 1 in Table 2. The laminated steel sheet was excellent in all the above-mentioned performance as a vibration-damping steel sheet. Similar results obtained with Inventive Examples 2 to 5, comprising predetermined polyesters and polymeric polyisocyanates, are shown in Tables 1 and 2, and the values of loss factor obtained with Inventive Examples 3 and 4 are shown in FIG. 1. In these cases, a polyethylene glycol having a number average molecular weight of 200 was used.

Inventive Examples 6 is an example in which the above procedure was repeated by use of the same polyester as used in Inventive Example 1 together with MDI (Millionate MT, NCO%: 30, a product by Nippon Polyurethane Industry Co., Ltd.) as the isocyanate compound. As shown in Table 2, the product showed a lowering in adhesion strength upon exposure to high temperatures around 200° C., which indicates poor heat resistance.

Comparative Example 1 is an example in which a polyester of a low molecular weight was used together with the isocyanate compound Coronate 2030. In this case, outflow of resin occurred at the time of the laminating and adhering step, and the product was unsatisfactory in both adhesion performance and formability.

It is evident from the above results that vibration-damping materials with good performance are obtainable only with the combinations according to this invention.

Figure 2:
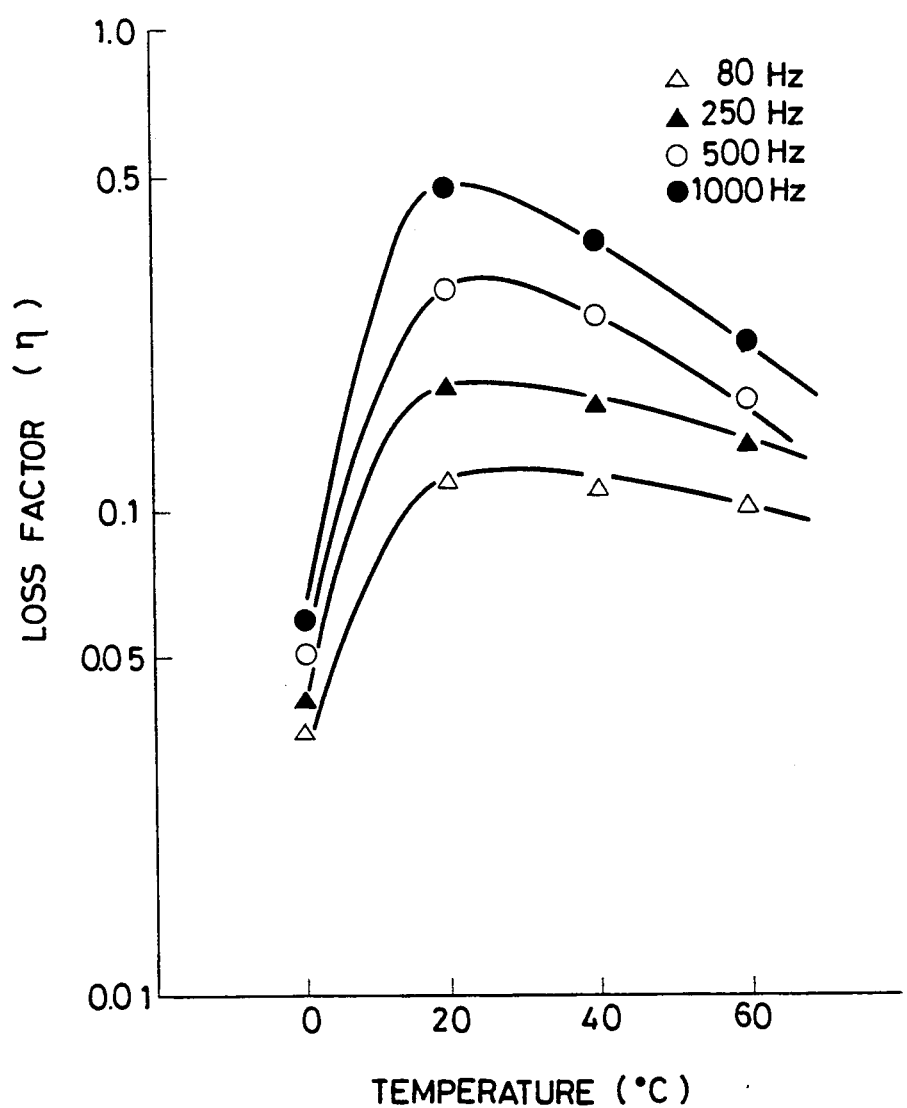
FIG. 2 is a diagram showing the measurement results of loss factor, at the indicated frequencies, of a vibration-damping steel sheet produced by use of a resin composition according this invention shown in Inventive Example 1 in Example 2.

Table 3 shows the effects of the loading amount of a conductive substance on spot-weldability and adhesion performance in the case of using the same resin composition as used in Inventive Example 1, together with a nickel powder as the conductive substance. When the loading amount was less than 1%, the desired spot-weldability was not obtainable, whereas a loading amount of more than 10% led to a lowering in adhesion performance.

solids content (nonvolatile content) of 30%, and the resultant solution was admixed with a polyfunctional isocyanate compound Coronate 2030 (NV: 50%; NCO%: 7.9, a product by Nippon Polyurethane Industry Co., Ltd.) in an amount of 5 parts by weight per 100 parts by weight of the polyester. The admixture thus obtained was applied to two steel sheets, and, after drying, the coated steel sheets were laid one each other an adhered in the laminated condition by a hot press. In this case, the amount of isocyanate groups was 1.1 equivalents per 1 equivalent of terminal hydroxyl groups of the polyester, and the degree of gelation was 43%. The thus laminated steel sheet was subjected to measurement of adhesion performance, formability and loss factor at frequencies of 80, 250, 500 and 1000 Hz, the results being shown in Table 4 and FIG. 2, as Inventive Example 1.

The above procedure was repeated, with the amount of the polyfunctional isocyanate compound changed to obtain respective degrees of gelation of 15% and 27%, the results being shown in Table 4, as Inventive Examples 2 and 3.

Also, the above procedure was repeated by use of the same polyester as used in Inventive Examples 3 and 5 in Example 1, together with Coronate L (NV: 75%;, NCO%: 13.2, a product by Nippon Polyurethane Industry Co., Ltd.) and MDI (Millionate MT, NCO%: 30, a

TABLE 1

| | | | Inv. Ex. 1 | 2 | 3 | 4 | 5 | 6 | Com. Ex. 1 |
|---|---|---|---|---|---|---|---|---|---|
| Polyester | Relative amount of residue of (moles) | Terephathlic acid | 80 | 80 | 60 | 60 | 75 | 80 | |
| | | Isophthalic acid | | | | | 25 | | |
| | | Adipic acid | 20 | 20 | 40 | | | 20 | 100 |
| | | Sebacic acid | | | | 40 | | | |
| | | Ethylene glycol | 45 | 45 | 60 | 60 | 40 | 45 | 80 |
| | | Neopentyl glycol | | | | | | | |
| | | 1,6-Hexanediol | 55 | 55 | 40 | 40 | 50 | 55 | |
| | | Polyethylene glycol | | | | | 10 | | 20 |
| | Physical properties | Weight average M.W. | 23000 | 23000 | 25000 | 28000 | 30000 | 23000 | 3000 |
| | | Softening point (°C.) | 129 | 120 | 100 | 100 | 95 | 120 | — |
| | | Glass transition temperature (°C.) | −10 | −10 | −25 | −30 | 5 | −10 | — |
| | Amount of polyester (parts by weight) | | 100 | 100 | 100 | 100 | 100 | 100 | 100 |
| Isocyanate compound | Amount (parts by weight) | M D I | | | | | | 10 | 25 |
| | | Coronate L | | | | | | | |
| | | Coronate 2030 | 8 | 10 | 10 | 10 | 10 | | |
| | Amount of isocyanate groups (equivalents/equivalent hydroxyl) | | 1.7 | 2.1 | 2.3 | 2.5 | 2.7 | 4.1 | 1.2 |
| | Degree of gelation (%) | | 58 | 74 | 72 | 75 | 75 | 87 | 74 |
| Adhesive strength | T-Peel strength (kgf/25 mm) | After 1 hr of adhesion | 17 | 17 | 16 | 16 | 18 | 9 | 1 |
| | | After 24 hr of adhesion | 18 | 19 | 17 | 18 | 20 | 13 | 5 |
| | Tensile shear strength (kgf/cm$^2$) | After 1 hr of adhesion | 95 | 97 | 94 | 92 | 95 | 80 | 15 |
| | | After 24 hr of adhesion | 103 | 105 | 96 | 98 | 101 | 87 | 31 |
| Formability | Bending to 4 mm 0 | In normal conditions | ◯ | ◯ | ◯ | ◯ | ◯ | ◯ | X |
| | | After held at 150° C. for 24 hr | ◯ | ◯ | ◯ | ◯ | ◯ | ◯ | X |
| | | After immersed in boiling water for 24 hr | ◯ | ◯ | ◯ | ◯ | ◯ | ◯ | X |

TABLE 2

| | | | Inv. Ex. 1 | 2 | 3 | 4 | 5 | 6 |
|---|---|---|---|---|---|---|---|---|
| Thermal stability | T-Peel strength (kgf/25 mm) | Before test | 18 | 19 | 17 | 18 | 20 | 13 |
| | | 180° C., after 1 hr | 19 | 20 | 19 | 19 | 22 | 15 |
| | | 200° C., after 1 hr | 18 | 19 | 17 | 18 | 19 | 9 |
| | | 220° C., after 1 hr | 13 | 14 | 14 | 14 | 13 | 6 |
| | Tensile shear strength (kgf/mm$^2$) | Before test | 103 | 105 | 96 | 98 | 101 | 87 |
| | | 180° C., after 1 hr | 108 | 105 | 103 | 107 | 105 | 92 |
| | | 200° C., after 1 hr | 105 | 102 | 101 | 103 | 98 | 64 |
| | | 220° C., after 1 hr | 85 | 87 | 79 | 82 | 88 | 53 |

TABLE 3

| | Conductive substance (vol %) | | | | | |
|---|---|---|---|---|---|---|
| | 0.5 | 2 | 5 | 8 | 13 | 5 |
| (L)/(T) ratio | 1.0 | 1.0 | 1.0 | 1.0 | 1.0 | 0.4 |
| Spot-weldability | bad | good | good | good | good | bad |
| T-Peel strength (kgf/25 mm) | 18 | 18 | 18 | 17 | 14 | 18 |

EXAMPLE 2

As Inventive Example 1, the polyester used in Inventive Example 1 of Example 1 was dissolved in a 1:1 (by weight) mixture of toluene and MEK so as to have a product by Nippon Polyurethane Industry Co., Ltd.), respectively, as the polyfunctional isocyanate compound, the results being shown in Table 4 as Inventive Examples 4 and 5. In these cases, a polyethylene glycol having a number average molecular weight of 200 was used.

Figure 3:
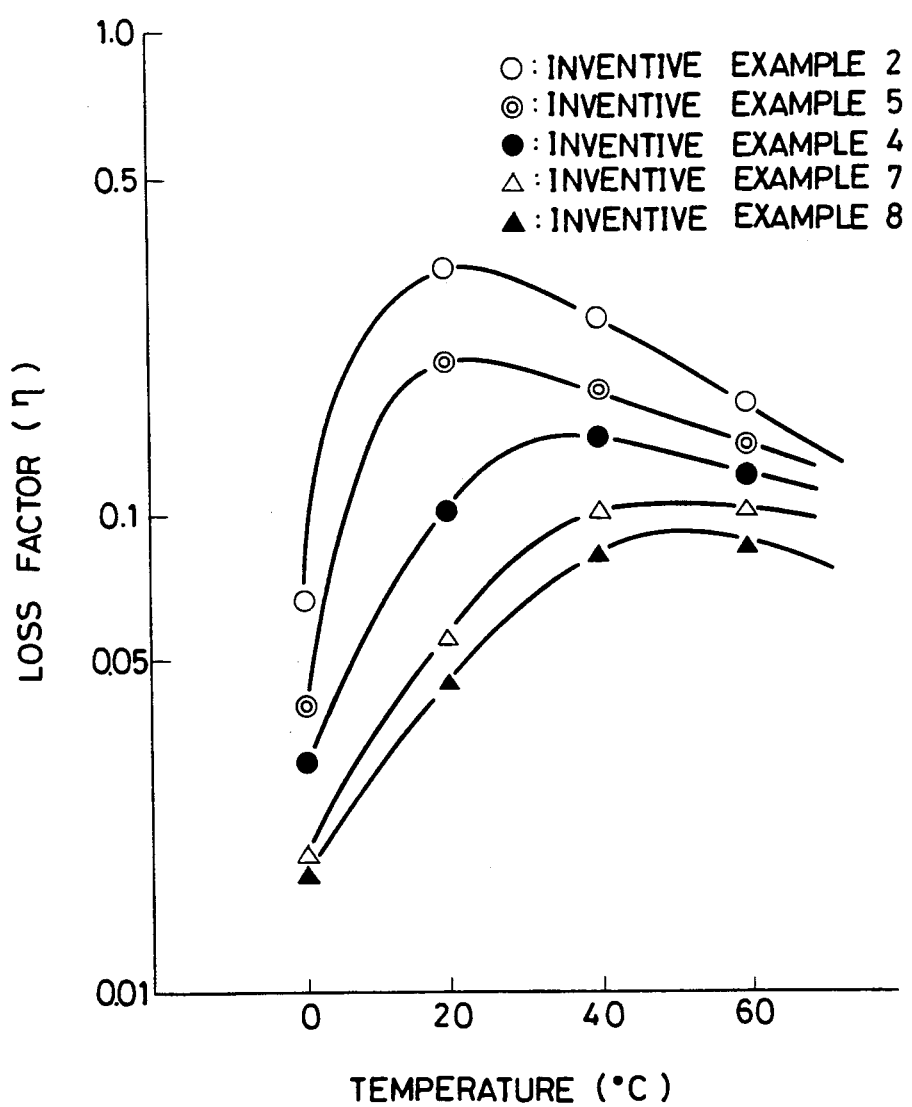
FIG. 3 is a diagram showing the measurement results of loss factor, at a frequency of 250 Hz, of vibration-damping steel sheets obtained in Inventive Examples 2, 4, 5, 7 and 8 in Example 2.

The values of loss factor at 250 Hz obtained in the Inventive Examples 2,4 and 5 are shown in FIG. 3. The products obtained in these Inventive Examples all showed excellent performance as vibration-damping steel sheets.

Further, an example of using 1,4-butanediol as the glycol component is shown in Table 4, as Inventive Example 6. This example gave better results regarding adhesion performance and formability in normal conditions, as compared with the Comparative Examples described below, but was insufficient in heat resistance of formed product and was limited in use.

Comparative Example 1, which is an example of sole use of the same polyester as used in Inventive Example 1, gave unsatisfactory results as to both adhesion performance and formability. Similarly, examples in which the same polyester as used in Inventive Example 1 was used together with Coronate 2030 and Coronate L as the polyfunctional isocyanate, with the degree of gelation set to 85% and 92%, respectively, are shown as Inventive Examples 7 and 8. The Inventive Examples 7 and 8 gave high adhesion strength and good formability, as shown in Table 4, but were slightly unsatisfactory as to vibration-damping performance in a low-frequency region represented by 250 Hz, as shown in FIG. 3.

Furthermore, an example of use of a low-molecular-weight polyester is similarly shown as Comparative Example 2. The polyester used here, being liquid at room temperature, caused outflow of resin at the time of the laminating and adhering step, and the adhesion performance after left to stand and vibration-damping performance in a low-frequency region were both unsatisfactory.

It is evident from the above results that vibration-damping materials with good performance are obtainable only with the combinations according to this invention.

Table 5 shows the effects of the loading amount of a conductive substance on spot-weldability and adhesion performance in the case of using the resin composition used in Inventive Example 1, together with a nickel powder as the conductive substance. If the loading amount is less than 1%, the desired spot-weldability was not obtainable, whereas a loading amount of more than 10% caused a lowering in adhesion performance.

TABLE 4

| | | | Inv. Ex. 1 | 2 | 3 | 4 | 5 | 6 |
|---|---|---|---|---|---|---|---|---|
| Polyester | Relative amount of residue of (moles) | Terphthalic acid | 80 | 80 | 80 | 60 | 75 | 35 |
| | | Isophthalic acid | | | | | 25 | |
| | | Adipic acid | 20 | 20 | 20 | 40 | | 65 |
| | | Sebacic acid | | | | | | |
| | | Ethylene glycol | 45 | 45 | 45 | 60 | 40 | |
| | | Neopentyl glycol | | | | | | |
| | | 1,6-Hexanediol | 55 | 55 | 55 | 40 | 50 | |
| | | Polyethylene glycol | | | | | 10 | |
| | | 1,4-Butanediol | | | | | | 100 |
| | Physical properties | Weight average M.W. | 23000 | 23000 | 23000 | 25000 | 30000 | 28000 |
| | | Softening point (°C.) | 120 | 120 | 120 | 100 | 90 | 110 |
| | | Glass transition temperature (°C.) | −10 | −10 | −10 | −25 | +5 | −40 |
| | Amount of polyester (parts by weight) | | 100 | 100 | 100 | 100 | 100 | 100 |
| Isocyanate compound | Amount (parts by weight) | MDI | | | | | 1.5 | |
| | | Coronate L | | | | 4.0 | | |
| | | Coronate 2030 | 5.0 | 3.0 | 4.0 | | | 7.0 |
| | Amount of isocyanate groups (equivalents/equivalent hydroxyl) | | 1.1 | 0.6 | 0.85 | 1.5 | 1.0 | 1.4 |
| | Degree of gelation (%) | | 43 | 15 | 27 | 67 | 37 | 53 |
| Adhesive strength | T-Peel strength (kgf/25 mm) | After 1 hr of adhesion | 14 | 13 | 13 | 15 | 14 | 10 |
| | | After 24 hr of adhesion | 16 | 14 | 15 | 18 | 17 | 11 |
| | Tensile shear strength (kgf/cm$^2$) | After 1 hr of adhesion | 82 | 78 | 85 | 80 | 78 | 55 |
| | | After 24 hr of adhesion | 95 | 80 | 88 | 86 | 81 | 69 |
| Formability | Bending to 4 mm 0 | In normal conditions | ○ | ○ | ○ | ○ | ○ | ○ |
| | | After held at 150° C. for 24 hr | ○ | ○ | ○ | ○ | ○ | X |
| | | After immersed in boiling water for 24 hr | ○ | ○ | ○ | ○ | ○ | X |

| | | | Comp. Ex. 1 | Inv. Ex. 7 | Inv. Ex. 8 | Comp. Ex. 2 |
|---|---|---|---|---|---|---|
| Polyester | Relative amount of residue of (moles) | Terphthalic acid | 80 | 80 | 80 | |
| | | Isophthalic acid | | | | |
| | | Adipic acid | 20 | 20 | 20 | 100 |
| | | Sebacic acid | | | | |
| | | Ethylene glycol | 45 | 45 | 45 | 80 |
| | | Neopentyl glycol | | | | |
| | | 1,6-Hexanediol | 55 | 55 | 55 | |
| | | Polyethylene glycol | | | | 20 |
| | | 1,4-Butanediol | | | | |
| | Physical properties | Weight average M.W. | 23000 | 23000 | 23000 | 3000 |
| | | Softening point (°C.) | 120 | 120 | 120 | |
| | | Glass transition temperature (°C.) | −10 | −10 | −10 | |
| | Amount of polyester (parts by weight) | | 100 | 100 | 100 | 100 |

TABLE 4-continued

| | | | | | | | |
|---|---|---|---|---|---|---|---|
| Isocyanate compound | Amount (parts by weight) | M D I<br>Coronate L<br>Coronate 2030 | | 15 | 10 | 25 | |
| | Amount of isocyanate groups (equivalents/equivalent hydroxyl) | | | 3.2 | 3.6 | 1.2 | |
| | Degree of gelation (%) | | 0 | 85 | 92 | 45 | |
| Adhesive strength | T-Peel strength (kgf/25 mm) | After 1 hr of adhesion<br>After 24 hr of adhesion | 6<br>6 | 19<br>22 | 12<br>15 | 1<br>5 | |
| | Tensile shear strength (kgf/cm²) | After 1 hr of adhesion<br>After 24 hr of adhesion | 32<br>46 | 100<br>110 | 83<br>93 | 15<br>31 | |
| Formability | Bending to 4 mm 0 | In normal conditions<br>After held at 150° C. for 24 hr<br>After immersed in boiling water for 24 hr | X<br>X<br>X | ○<br>○<br>○ | ○<br>○<br>○ | X<br>X<br>X | |

TABLE 5

| | Conductive substance (vol %) | | | | | |
|---|---|---|---|---|---|---|
| | 0.5 | 2 | 5 | 8 | 13 | 5 |
| (L)/(T) ratio | 1.0 | 1.0 | 1.0 | 1.0 | 1.0 | 0.4 |
| Spot-weldability | bad | good | good | good | good | bad |
| T-Peel strength (kgf/25 mm) | 15 | 15 | 15 | 14 | 11 | 15 |

EXAMPLE 3

Figure 4:
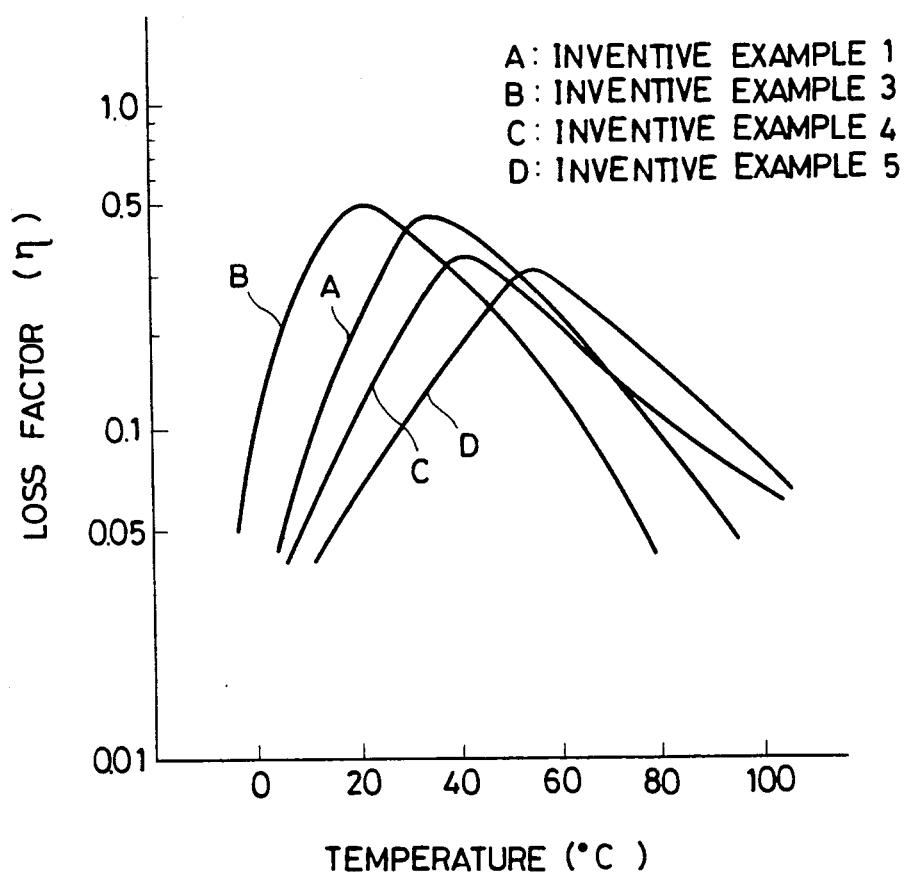
FIG. 4 is a diagram showing the measurement results of loss factor, at a frequency of 1000 Hz, of vibration-damping steel sheets produced by used of a resin composition according to this invention, in which A, B, C and D denote the measurement results of loss factor for Inventive Examples 1, 3, 4 and 5 in Example 3.

As Inventive Example 1, the polyester used in Inventive Example 1 of Example 1 was dissolved in a 1:1 (by weight) mixture of toluene and MEK so as to have a solids content (nonvolatile content) of 30%, and the resultant solution was admixed with a polymeric polyisocyanate Coronate L (NV: 75%; NCO%: 13.2, a product by Nippon Polyurethane Industry Co., Ltd.) in an amount of 10 parts by weight per 100 parts by weight of the polyester. The admixture thus obtained was applied to two steel sheets, and, after drying, the coated steel sheets were laid on each other and adhered in the laminated condition by a hot press. In this case, the amount of isocyanate groups was 3.6 equivalents per 1 equivalent of terminal hydroxyl groups of the polyester. The thus laminated steel panel was subjected to measurement of adhesion performance, formability and loss factor, the results being shown as Inventive Example 1 in Table 6 and FIG. 4. The laminated steel sheet was excellent in all the above-mentioned performance as a vibration-damping steel sheet. Similar results obtained with Inventive Examples 2 to 5, comprising predetermined polyesters and polymeric polyisocyanates, are shown in Table 6, and the values of loss factor obtained with Inventive Examples 3, 4 and 5 are shown in FIG. 4. In these cases, a polyethylene glycol having a number average molecular weight of 200 was used.

Inventive Example 6, as shown in Table 6, is an example in which the above procedure was repeated by use of the same polyester as used in Inventive Example 1 together with MDI (Millionate MT, NCO%: 30, a product by Nippon Polyurethane Industry Co., Ltd.) as the isocaynate compound.

Further, an example of using 1,4-butanediol as the glycol component is shown Table 6 as Inventive Example 7. The product showed a good adhesion performance and a good formability under normal conditions, but with insufficient heat stability, compared to the Comparative Examples, resulting in limited applicability of the product.

Similarly, an example of using a two pack type uretane is shown as Comparative Example 1. In this case, outflow of resin occurred at the time of the laminating and adhering step, because the polyester was liquid at room temperature, and the product was unsatisfactory in adhesion performance after standing.

Comparative Example 2 is an example in which the polyester used in Inventive Example 1 is used as the sole material. The product was unsatisfactory in both adhesion performance and formability.

It is evident from results that vibration-damping steel materials with good performance are obtainable only with the combinations according to this invention.

TABLE 6

| | | | Inv. Ex. 1 | 2 | 3 | 4 | 5 |
|---|---|---|---|---|---|---|---|
| Polyester | Relative amount of residue of (moles) | Terephthalic acid | 80 | 60 | 60 | 75 | 80 |
| | | Isophthalic acid | | | | 25 | 20 |
| | | Adipic acid | 20 | 40 | | | |
| | | Sebacic acid | | | 40 | | |
| | | Ethylene glycol | 45 | 60 | 60 | 40 | 45 |
| | | Neopentyl glycol | | | | | 55 |
| | | 1,6-Hexanediol | 55 | 40 | 40 | 50 | |
| | | Polyethylene glycol | | | | 10 | |
| | | 1,4-Butanediol | | | | | |
| | Physical properties | Weight average M.W. | 23000 | 25000 | 28000 | 30000 | 22000 |
| | | Softening point (°C.) | 120 | 100 | 100 | 90 | 100 |
| | | Glass transition temperature (°C.) | −10 | −25 | −30 | 5 | 15 |
| | Amount of polyester (parts by weight) | | 100 | 100 | 100 | 100 | 100 |
| Isocyanate compound | Amount (parts by weight) | M D I<br>Coronate L | 10 | 15 | 15 | 15 | 15 |
| | Amount of isocyanate groups (equivalents/equivalent hydroxyl) | | 3.6 | 5.9 | 6.6 | 7.0 | 5.2 |
| | Degree of gelation (%) | | 92 | 94 | 90 | 92 | 94 |

TABLE 6-continued

| | | | | | | | |
|---|---|---|---|---|---|---|---|
| Adhesive strength | T-Peel strength (kgf/25 mm) | After 1 hr of adhesion | 12 | 16 | 15 | 13 | 10 |
| | | After 24 hr of adhesion | 15 | 21 | 22 | 20 | 18 |
| | Tensile shear strength (kgf/cm$^2$) | After 1 hr of adhesion | 64 | 74 | 72 | 62 | 56 |
| | | After 24 hr of adhesion | 74 | 83 | 85 | 74 | 72 |
| Formability | Bending to 4 mm 0 | In normal conditions | ○ | ○ | ○ | ○ | ○ |
| | | After held at 150° C. for 24 hr | ○ | ○ | ○ | ○ | ○ |
| | | After immersed in boiling water for 24 hr | ○ | ○ | ○ | ○ | ○ |

| | | | 6 | 7 | Comp. Ex 1 | Comp. Ex. 2 |
|---|---|---|---|---|---|---|
| Polyester | Relative amount of residue of (moles) | Terephthalic acid | 80 | 35 | | 80 |
| | | Isophthalic acid | | | | |
| | | Adipic acid | 20 | 65 | 100 | 20 |
| | | Sebacic acid | | | | |
| | | Ethylene glycol | 45 | | 80 | 45 |
| | | Neopentyl glycol | | | | |
| | | 1,6-Hexanediol | 55 | | | 55 |
| | | Polyethylene glycol | | | 20 | |
| | | 1,4-Butanediol | | 100 | | |
| | Physical properties | Weight average M.W. | 23000 | 28000 | 3000 | 23000 |
| | | Softening point (°C.) | 120 | 110 | | 120 |
| | | Glass transition temperature (°C.) | −10 | −40 | | −10 |
| | Amount of polyester (parts by weight) | | 100 | 100 | 100 | 100 |
| Isocyanate compound | Amount (parts by weight) | MDI | 5 | | | |
| | | Coronate L | | 15 | 25 | |
| | Amount of isocyanate groups (equivalents/equivalent hydroxyl) | | 4.1 | 6.6 | 1.2 | 0 |
| | Degree of gelation (%) | | 87 | 89 | 45 | 0 |
| Adhesive strength | T-Peel strength (kgf/25 mm) | After 1 hr of adhesion | 9 | 10 | 1 | 6 |
| | | After 24 hr of adhesion | 13 | 12 | 5 | 6 |
| | Tensile shear strength (kgf/cm$^2$) | After 1 hr of adhesion | 61 | 51 | 8 | 35 |
| | | After 24 hr of adhesion | 72 | 66 | 26 | 35 |
| Formability | Bending to 4 mm 0 | In normal conditions | ○ | ○ | X | X |
| | | After held at 150° C. for 24 hr | ○ | X | X | X |
| | | After immersed in boiling water for 24 hr | ○ | X | X | X |

As has been described above, according to this invention, a specified saturated copolyester and a polyfunctional isocyanate compound are jointly used as an intermediate resin layer for exhibiting a vibration-damping effect, with the degree of gelation of the resin layer, when cured, controlled to be at least 10%, whereby a vibration-damping material is obtainable which has excellent vibration-damping properties at around normal temperature, specifically 0° to 50° C., has sufficient adhesion performance for enduring press forming and processing, has heat resistance and durability of 100° C. or above and is applicable to a low-frequency region below 250 Hz. The vibration-damping material obtained according to this invention is thus applicable not only to building materials used in substantially flat conditions, without need for formability, but also to automobile trim parts such as dashboard, floor panel, roof panel, etc. to which the conventional vibration-damping materials could not be satisfactorily applied. Therefore, according to this invention it is possible to provide a vibration-damping material having extremely excellent performance and capable of being used widely in the automobile industry, civil engineering and construction industries and electrical machinery industry, with remarkable effects on those industries.

What we claim is:

1. A resin composition for a composite-type vibration-damping material which comprises a saturated copolyester having a weight average molecular weight of at least 10,000 and a softening point of 50° to 150° C. and a polyfunctional isocyanate compound and which, when cross-linked, has a degree of gelation (degree of cross-linking) of at least 10%.

2. The resin composition as set forth in claim 1, wherein the polyfunctional isocyanate compound is an isocyanate compound having at least three isocyanate groups.

3. The resin composition as set forth in claim 1, wherein the polyfunctional isocyanate compound is a polymerized polyisocyanate compound.

4. The resin composition as set forth in claim 1, wherein the saturated copolyester has a weight average molecular weight of 20,000 to 50,000.

5. The resin composition as set forth in any one of claims 1 to 4, wherein the degree of gelation (degree of cross-linking), when cross-linked, is 10 to 80%.

6. The resin composition as set forth in any one of claims 1 to 4, wherein the degree of geletion (degree of cross-linking), when cross-linked, is 20 to 60%.

7. A resin composition for a composite-type vibration-damping material comprising a composition which comprises a saturated copolyester having a weight average molecular weight of at least 10,000 and a softening point of 50° to 150° C. and a polyfunctional isocyanate compound and which, when cross-linked, has a degree of gelation (degree of cross-linking) of at least 10%, the resin composition further comprising a conductive substance.

8. The resin composition as set forth in claim 7, wherein the polyfunctional isocyanate compound is an isocyanate compound having at least three isocyanate groups.

9. The resin composition as set forth in claim 7, wherein the polyfunctional isocyanate compound is a polymerized polyisocyanate compound.

10. The resin composition as set forth in claim 7, wherein the saturated copolyester has a weight average molecular weight of 20,000 to 50,000.

11. The resin composition as set forth in any one of claims 7 to 10, wherein the degree of gelation (degree of cross-linking) of the composition cross-linked is 10 to 80%.

12. The resin composition as set forth in any one of claims 7 to 10, wherein the degree of gelation (degree of cross-linking) of the composition cross-linked is 20 to 60%.

13. A composite-type vibration-damping material comprising an intermediate resin layer which comprises a saturated copolyester having a weight average molecular weight of at least 10,000 and a softening point of 50° to 150° C. and a polyfunctional isocyanate compound and which has a degree of gelation (degree of cross-linking) of at least 10%.

14. The composite-type vibration-damping material as set forth in claim 13, wherein the polyfunctional isocyanate compound is a polymerized polyisocyanate compound.

15. The composite-type vibration-damping material as set forth in claim 13 or 14, wherein the degree of gelation (degree of cross-linking) of the resin composition cross-linked is 10 to 80%.

16. The composite-type vibration-damping material as set forth in claim 13 or 14, wherein the degree of gelation (degree of cross-linking) of the resin composition cross-linking linking is 20 to 60%.

17. A composite-type vibration-damping material comprising an intermediate layer of a mixture of a resin composition with a conductive substance, the resin composition comprising a saturated copolyester having a weight average molecular weight of at least 10,000 and a softening point of 50° to 150° C. and a polyfunctional isocyanate compound, the resin composition having a degree of gelation (degree of cross-linking) of at least 10%, the conductive substance having a diameter of at least 0.5 times the thickness of the resin layer.

18. The composite-type vibration-damping material as set forth in claim 17, wherein the polyfunctional isocyanate compound is a polymerized polyisocyanate compound.

19. The composite-type vibration-damping material as set forth in claim 17 or 18, wherein the degree of gelation (degree of cross-linking) is 10 to 80%.

20. The composite-type vibration-damping material as set forth in claim 17 or 18, wherein the degree of gelation (degree of cross-linking) is 20 to 60%.

21. A process for producing a composite-type vibration-damping material which comprises the step of providing, between sheet materials, a mixture obtained by mixing a saturated copolyester having a weight average molecular weight of at least 10,000 and a softening point of 50° to 150° C. with a polyfunctional isocyanate compound so that the mixture, when cross-linked, has a degree of gelation (degree of cross-linking) of at least 10%.

22. The process as set forth in claim 21, wherein the polyfunctional isocyanate compound is a polymerized polyisocyanate compound.

23. A process for producing a composite-type vibration-damping material which comprises the step of providing, between sheet materials, a mixture obtained by mixing a saturated copolyester having a weight average molecular weight of at least 10,000 and a softening point of 50° to 150° C. with a polyfunctional isocyanate compound so that the mixture, when cross-linked, has a degree of gelation (degree of cross-linking) of at least 10%, and mixing a conductive substance into the mixture of the saturated copolyester and the polyfunctional isocyanate compound.

24. The process as set forth in claim 23, wherein the polyfunctional isocyanate compound is a polymerized polyisocyanate compound.

* * * * *

UNITED STATES PATENT AND TRADEMARK OFFICE
CERTIFICATE OF CORRECTION

PATENT NO. : 5,061,778
DATED : October 29, 1991
INVENTOR(S) : Yasunobu Uchida et al It is certified that error appears in the above-identified patent and that said Letters Patent is hereby corrected as shown below:

Column 3, line 42, before "vibration-damping" insert --in--.

Columns 15 and 16, in Table 1, Softening point (°C.), in "Inv. Ex. 1", please change "129" to --120--.

Column 15, line 66, change "1" to --2--.

Column 19, line 29, change "1" to --3--.

Column 23, line 39, delete "linking".

Signed and Sealed this

First Day of June, 1993

Attest:

MICHAEL K. KIRK

*Attesting Officer*    Acting Commissioner of Patents and Trademarks